United States Patent
McBrearty

(10) Patent No.: US 11,669,506 B2
(45) Date of Patent: Jun. 6, 2023

(54) SEARCHABLE ENCRYPTION

(71) Applicant: VAULTREE LTD., County Tipperary (IE)

(72) Inventor: Shaun McBrearty, Lifford (IE)

(73) Assignee: VAULTREE LTD., County Tipperary (IE)

( * ) Notice: Subject to any disclaimer, the term of this patent is extended or adjusted under 35 U.S.C. 154(b) by 0 days.

(21) Appl. No.: 17/656,164

(22) Filed: Mar. 23, 2022

(65) Prior Publication Data
US 2022/0318219 A1 Oct. 6, 2022

Related U.S. Application Data

(63) Continuation of application No. PCT/EP2021/057377, filed on Mar. 23, 2021.

(51) Int. Cl.
*G06F 16/00* (2019.01)
*G06F 16/22* (2019.01)
*G06F 16/2457* (2019.01)
*G06F 16/248* (2019.01)
*H04L 9/32* (2006.01)

(52) U.S. Cl.
CPC ........ *G06F 16/2255* (2019.01); *G06F 16/248* (2019.01); *G06F 16/24573* (2019.01); *H04L 9/3213* (2013.01); *H04L 9/3242* (2013.01)

(58) Field of Classification Search
CPC .......... G06F 16/2255; G06F 16/24573; G06F 16/248; H04L 9/3213; H04L 9/3242
USPC .................................................. 707/600–899
See application file for complete search history.

(56) References Cited

U.S. PATENT DOCUMENTS

| | | | |
|---|---|---|---|
| 2012/0078914 A1* | 3/2012 | Roeder | G06F 16/316 707/741 |
| 2016/0283600 A1* | 9/2016 | Ackerly | H04L 63/04 |
| 2017/0242912 A1* | 8/2017 | Mohassel | G06F 16/20 |
| 2019/0121873 A1* | 4/2019 | Woodworth | G06F 40/30 |
| 2019/0340381 A1* | 11/2019 | Yavuz | H04L 9/14 |
| 2020/0034546 A1* | 1/2020 | Hackenjos | H04L 9/0894 |

(Continued)

FOREIGN PATENT DOCUMENTS

WO  WO 2015/055762 A1  4/2015

OTHER PUBLICATIONS

McBrearty et al., The performance cost of preserving data/query privacy using searchable symmetric encryption: Symmetric search encryption performance, Security and Communications Networks, vol. 9, No. 18, Nov. 10, 2016, 5211-5332.

(Continued)

*Primary Examiner* — Michelle N Owyang
(74) *Attorney, Agent, or Firm* — Patterson Thuente, P.A.

(57) ABSTRACT

The present disclosure is directed towards a system, method, and computer readable storage medium for searchable encryption. A plurality of search terms are extracted from at least a part of a data structure. A keyed-hash value for each search term is calculated and stored in a list. The value of a bit in a predetermined position within each keyed-hash value is examined. If the value of the bit is a first value for α of the keyed-hash values and a second value for α of the keyed-hash values, wherein α is a number greater or equal to two and the first value is different to the second value, then the set of keyed-hash values is split into two lists. Each list is assigned a search token value.

20 Claims, 10 Drawing Sheets

(56) References Cited

U.S. PATENT DOCUMENTS

2020/0125563 A1* 4/2020 Fan ................... H04L 9/0894
2020/0159779 A1* 5/2020 Dong .................. H04L 9/0643
2022/0058198 A1* 2/2022 Dupont ............... G06F 16/2455

OTHER PUBLICATIONS

Vaultree Ltd., International Appln. No. PCT/EP2021/057377, ISR-WO, dated Dec. 2, 2021, 15 pp.

* cited by examiner

| Doc ID | Content |
|---|---|
| 1 | new home sales top forecasts |
| 2 | home sales rise in july |
| 3 | house sales rise mid-year |
| 4 | house sales increase mid-year |
| 5 | property sales increase mid-year |
| 6 | apartment sales increase in july |
| 7 | increase in home sales in early q3 |
| 8 | July new dwelling sales rise |

1000

| Term | Posting List |
|---|---|
| new | 1, 8 |
| home | 1, 2, 7 |
| sales | 1, 2, 3, 4, 5, 6, 7, 8 |
| top | 1 |
| forecasts | 1 |
| rise | 2, 3, 8 |
| in | 2, 6, 7 |
| July | 2, 6, 8 |
| house | 3, 4 |
| mid-year | 3, 4, 5 |
| increase | 4, 5, 6, 7 |
| property | 5 |
| apartment | 6 |
| early | 7 |
| q3 | 7 |
| dwelling | 8 |

| Keyyed-Hash Value of Term (Hex) | Term* | Posting List |
|---|---|---|
| 4C92C296EC72B0614D4272509910AF5C | new | 1, 8 |
| 6F324F5E888B01998A0511B5148311BE | home | 1, 2, 7 |
| 52BF8F13B462A0723A5F7E10915EFBDC | sales | 1, 2, 3, 4, 5, 6, 7, 8 |
| 5DC3E30A0A566C1D2A71F12F0A324CEF | top | 1 |
| B0B5BAC192FECD65F42840DE51DECC29 | forecasts | 1 |
| A4240B55C1C5256BD9476B88A8751653 | rise | 2, 3, 8 |
| F0C91E00BEE1E9A82551C5113265F3EE | in | 2, 6, 7 |
| 470F62404DC97405CD453E6FA88A0055 | July | 2, 6, 8 |
| FB599F9751C8C1463584535447509312 | house | 3, 4 |
| EC9834940562990B4366DEC5A4697512 | mid-year | 3, 4, 5 |
| 3264997C6731A94C9A535FABB60C7235 | increase | 4, 5, 6, 7 |
| 2EBAB14189EF58887E2E16DF86BC1BF1 | property | 5 |
| 04FC6AC12E49B1BCE85EBD718EA97428 | apartment | 6 |
| 8F8C8E375EBC710622B97AEDF0814959 | early | 7 |
| 2F679D40F1E51EBADB81666386F8E53 | q3 | 7 |
| 46AB0DCD13DB4E31E6F5A310DFBB2DAD | dwelling | 8 |

MSB(1,1)=0
Count: 0

MSB(1,1)=1
Count: 0

| KHVofT (Binary) | | | | | | | | | Term* | Posting List |
|---|---|---|---|---|---|---|---|---|---|---|
| 0 | 0 | 0 | 0 | 0 | 0 | 1 | 0 | ... | new | 1, 8 |
| 0 | 1 | 0 | 1 | 1 | 1 | 1 | 1 | ... | home | 1, 2, 7 |
| 1 | 0 | 0 | 0 | 1 | 0 | 0 | 0 | ... | sales | 1, 2, 3, 4, 5, 6, 7, 8 |
| 0 | 1 | 1 | 1 | 0 | 1 | 0 | 1 | ... | top | 1 |
| 1 | 0 | 1 | 1 | 0 | 0 | 0 | 0 | ... | forecasts | 1 |
| 0 | 1 | 0 | 0 | 1 | 0 | 0 | 0 | ... | rise | 2, 3, 8 |
| 1 | 1 | 1 | 1 | 0 | 1 | 0 | 0 | ... | in | 2, 6, 7 |
| 1 | 1 | 0 | 0 | 1 | 0 | 1 | 1 | ... | July | 2, 6, 8 |
| 1 | 1 | 0 | 1 | 0 | 1 | 1 | 1 | ... | house | 3, 4 |
| 0 | 0 | 1 | 0 | 1 | 0 | 0 | 0 | ... | mid-year | 3, 4, 5 |
| 1 | 0 | 1 | 1 | 1 | 1 | 0 | 1 | ... | increase | 4, 5, 6, 7 |
| 0 | 0 | 0 | 0 | 1 | 1 | 0 | 0 | ... | property | 5 |
| 0 | 0 | 0 | 0 | 1 | 1 | 0 | 0 | ... | apartment | 6 |
| 1 | 0 | 0 | 0 | 1 | 1 | 1 | 1 | ... | early | 7 |
| 0 | 1 | 0 | 0 | 0 | 1 | 1 | 1 | ... | q3 | 7 |
| 0 | 1 | 0 | 0 | 0 | 1 | 0 | 0 | ... | dwelling | 8 |

| Search Token | KHVofT (Binary) | | | | | | | | | | Term* | Posting List |
|---|---|---|---|---|---|---|---|---|---|---|---|---|
| 0 4011 | 0 | 0 | 0 | 0 | 0 | 0 | 0 | 0 | 0 | ... | new | 1, 8 |
| | 1 | 1 | 1 | 1 | 0 | 1 | 1 | 1 | 0 | ... | home | 1, 2, 7 |
| | 0 | 0 | 0 | 0 | 1 | 0 | 0 | 0 | 1 | ... | sales | 1, 2, 3, 4, 5, 6, 7, 8 |
| | 0 | 1 | 1 | 1 | 1 | 1 | 1 | 1 | 0 | ... | top | 1 |
| | 0 | 0 | 1 | 0 | 1 | 1 | 0 | 1 | 1 | ... | July | 2, 6, 8 |
| | 0 | 1 | 0 | 1 | 0 | 0 | 1 | 0 | 0 | ... | increase | 4, 5, 6, 7 |
| | 0 | 0 | 1 | 1 | 1 | 1 | 1 | 1 | 0 | ... | property | 5 |
| | 0 | 0 | 0 | 0 | 0 | 0 | 1 | 0 | 0 | ... | apartment | 6 |
| | 0 | 1 | 0 | 0 | 1 | 1 | 0 | 1 | 1 | ... | q3 | 7 |
| | 0 | 0 | 1 | 0 | 0 | 1 | 1 | 0 | 0 | ... | dwelling | 8 |
| 1 4012 | 1 | 0 | 1 | 1 | 1 | 0 | 0 | 0 | 0 | ... | forecasts | 1 |
| | 1 | 0 | 1 | 1 | 0 | 0 | 1 | 0 | 0 | ... | rise | 2, 3, 8 |
| | 1 | 1 | 1 | 0 | 1 | 1 | 0 | 1 | 0 | ... | in | 2, 6, 7 |
| | 1 | 1 | 1 | 1 | 0 | 1 | 1 | 1 | 1 | ... | house | 3, 4 |
| | 1 | 0 | 0 | 0 | 0 | 0 | 0 | 0 | 0 | ... | mid-year | 3, 4, 5 |
| | 1 | 0 | 1 | 1 | 1 | 1 | 1 | 1 | 1 | ... | early | 7 |

FIG. 4

| Search Token | KHVofT (Binary) | | | | | | | | Term* | Posting List |
|---|---|---|---|---|---|---|---|---|---|---|
| 00 5011 | 0 | 0 | 0 | 0 | 0 | 0 | 1 | 0 | ... new | 1, 8 |
| | 0 | 0 | 0 | 1 | 0 | 0 | 1 | 0 | ... increase | 4, 5, 6, 7 |
| | 0 | 0 | 0 | 1 | 0 | 1 | 1 | 0 | ... property | 5 |
| | 0 | 0 | 0 | 0 | 1 | 1 | 0 | 0 | ... apartment | 6 |
| | 0 | 0 | 0 | 0 | 1 | 0 | 0 | 1 | ... q3 | 7 |
| 01 5012 | 0 | 1 | 1 | 0 | 1 | 1 | 1 | 1 | ... home | 1, 2, 7 |
| | 0 | 1 | 1 | 1 | 1 | 1 | 1 | 1 | ... sales | 1, 2, 3, 4, 5, 6, 7, 8 |
| | 0 | 1 | 0 | 0 | 0 | 1 | 0 | 0 | ... top | 1 |
| | 0 | 1 | 0 | 1 | 1 | 1 | 1 | 1 | ... july | 2, 6, 8 |
| | 0 | 1 | 0 | 0 | 0 | 1 | 1 | 0 | ... dwelling | 8 |
| 10 5013 | 1 | 0 | 1 | 0 | 1 | 0 | 0 | 0 | ... forecasts | 1 |
| | 1 | 0 | 0 | 0 | 0 | 0 | 0 | 0 | ... rise | 2, 3, 8 |
| | 1 | 0 | 1 | 1 | 1 | 1 | 1 | 1 | ... early | 7 |
| 11 5014 | 1 | 1 | 1 | 1 | 0 | 1 | 0 | 0 | ... in | 2, 6, 7 |
| | 1 | 1 | 0 | 1 | 1 | 0 | 1 | 1 | ... house | 3, 4 |
| | 1 | 1 | 1 | 1 | 1 | 1 | 0 | 0 | ... mid-year | 3, 4, 5 |

FIG. 5

| Doc ID | Content |
|---|---|
| 2 | home sales rise in july |
| 3 | house sales rise mid-year |
| 4 | house sales increase mid-year |
| 5 | property sales increase mid-year |
| 6 | apartment sales increase in july |
| 7 | increase in home sales in early q3 |

7000

| Doc ID | Content |
|---|---|
| 2 | ~~home sales rise in july~~ |
| 3 | house sales rise mid-year |
| 4 | house sales increase mid-year |
| 5 | property sales increase mid-year |
| 6 | ~~apartment sales increase in july~~ |
| 7 | ~~increase in home sales in early q3~~ |

9070, 9550, 9500

| Doc ID | Content |
|---|---|
| 3 | house sales rise mid-year |
| 4 | house sales increase mid-year |
| 5 | property sales increase mid-year |

| Search Token | 11 | "Noisy" Posting List: | 2, 3, 4, 5, 6, 7 |
|---|---|---|---|
| δ: | RAND VAL | λ | Encrypted Posting List |
| Suitable for Partition: | False | Encrypted Keyyed-Hash Value of Term (Hex) | |
| Recently Partitioned: | False | F0C91E00BEE1E9A82551C5113265F3EE | RAND VAL | 2, 6, 7 |
| | | FB599F9751C8C14635845354475O9312 | RAND VAL | 3, 4 |
| | | EC9834940562990B4366DEC5A4697512 | RAND VAL | 3, 4, 5 |

FIG. 11B

| Encrypted Keyyed-Hash Value of Term | λ | Encrypted Posting List |
|---|---|---|
| F0C91E00BEE1E9A82551C5113265F3EE | RAND VAL | 2, 6, 7, 11 |
| FB599F9751C8C14635845354475O9312 | RAND VAL | 3, 4 |
| EC9834940562990B4366DEC5A4697512 | RAND VAL | 3, 4, 5 |

1

SEARCHABLE ENCRYPTION

CROSS-REFERENCE TO RELATED APPLICATIONS

This present application is a continuation application of PCT Application No. PCT/EP2021/057377 filed Mar. 23, 2021, the contents of which is incorporated herein by reference in its entirety.

FIELD

The present application is directed towards a systems and methods for searchable encryption. In particular, the present application is directed towards a new system and method for working with encrypted data in an efficient manner.

BACKGROUND

As noted above, the present application is directed towards new system and method for encrypting and decrypting search results which provides security when search encrypted data. The present disclosure makes it possible to search encrypted data without prior art security flaws. In addition, systems and methods in accordance with the present disclosure operate in a highly efficient manner and outperform prior art solutions such as Searchable Symmetric Encryption (SSE).

In order to aid a person skilled in the art understand the present disclosure, the following explanation of SSE and its short comings is provided. SSE was developed to solve known problems with symmetric encryption. For example, one issue with symmetric encryption is that once a collection of documents has been encrypted, there is no mechanism for searching the contents of a document within the collection without decrypting the entire collection. SSE is an encryption technique which overcomes this by providing a mechanism for searching an encrypted collection of documents.

FIG. 1 shows a prior art SSE system. With reference to FIG. 1, searching is performed using a special-purpose index data structure 1500 created (referred to herein as an index for brevity). The index 1500 is created from the document collection 1000 prior to being encryption. The index 1500 contains search terms 1510 which occur in the collection of documents 1000—i.e. a term can be used to perform a search and the resultant search will return a list of documents containing the term.

Once the index 1500 has been created, the document collection can be encrypted using a conventional symmetric method. The contents 1510 of the index 1500, as well as posting list 1520, are also encrypted. The posting list 1520 is a data structure identifying the set of documents that each term 1510 occurs in. As such the posting list 1520 comprises data identifying a given term 1510 along with data identifying the documents associated with the given term 1510. As a result, when a search is performed, the search term can be sent to a search engine in an encrypted form.

SSE is of particular importance in Client-Server systems, where one or more remote servers are used to store the encrypted document collections (and in SSE systems, the associated Index). SSE allows a client device to send search queries comprising one or more encrypted search terms to the server requesting a subset of the encrypted documents that contain one or more of the encrypted search terms.

In addition to supporting search operations, some SSE systems can include support for dynamic document collections, whereby clients can perform one or more of the following operations: i) add additional documents to the document collection; ii) update documents already contained within the document collection; and iii) delete documents from the document collection. In each operation, the index associated with the document collection is updated so that it remains consistent with the document collection.

In order to perform a search operation in SSE, a client must provide a server with a search token value. The search token value is an encrypted value derived from a search term received at the client (e.g. a user entered search term). The search token value is used by the server in conjunction with the index to determine the subset of encrypted documents that contain the search term. The server then provides the subset encrypted documents to the client. The subset of encrypted documents can then be decrypted locally at the client.

However, even though search token values and the associated matching document set are both encrypted, they can still be used for cryptanalysis. Indeed, search token values have been successfully exploited in a practical setting to perform a class of cryptanalytic attacks known as Leakage Abuse Attacks (LAAs).

In LAAs, a search token is typically referred to as a search pattern. The encrypted document set is typically referred to as the access pattern. For LAAs to succeed, each term must be associated with a unique search pattern value and/or at least some of the access patterns provided by the server are unique. There is therefore a need to improve the security of communication between a client and a server and to minimize the risks associated with LAAs on SSE systems in an efficient manner.

SUMMARY

The present disclosure is directed towards a system, method, and computer readable storage medium for searchable encryption, the features of which are set out in the appended claims.

The system comprises a client device, the client device comprising an index build module, wherein the index build module comprises a processor configured to: extract a plurality of search terms from at least a part of a data structure; calculate a keyed-hash value for each search term and store the keyed-hash values in a list; examine a bit in a first predetermined position within the keyed-hash value for each keyed-hash value to obtain the value of the bit; perform a first determination to determine if it is true that the value of the bit has a first value for at least $\alpha$ of the keyed-hash values, and the value of the bit has a second value for at least $\alpha$ of the keyed-hash values, wherein $\alpha$ is a number greater or equal to two and the first value is different to the second value; split the set of keyed-hash values into two lists if the first determination is true; and assign a first search token value to the first list and second search token value to the second list each, whereby each search token value is associated with a plurality of search terms.

In embodiments, the value of the first search token value equals the first value and the second search token value equals the second value.

In embodiments, the index build module is further configured to: perform a second determination to determine if it is true that: a bit in a second predetermined position has the first value for at least $\alpha$ of the keyed-hash values in the first list; the bit in the second predetermined position has the second value for at least $\alpha$ of the keyed-hash values in the first list; the bit in the second predetermined position has the first value for at least $\alpha$ of the keyed-hash values in the second list; and the bit in the second predetermined position has the second value for at least α of the keyed-hash values in the second list; split the first and second lists if the second determination is true, such that the first list is split into a new first and second list and the second list is split into a new third and fourth list; and assign a new first search token value to the new first list, a new second search token value to the new second list each, a new third value search token value to the new third list, and a new fourth search token value to the new fourth list.

In embodiments, the value of the new first search token value equals the first search token value appended with the first value; the value of the new second search token value equals the first search token value appended with the second value; the value of the new third search token value equals the second search token value appended with the first value; and the value of the new fourth search token value equals the second search token value appended with the second value.

In embodiments, the index build module is configured to encrypt the keyed-hash values of the search terms before the keyed-hash values are provided to a server.

In embodiments, the index build module is configured to generate and store a posting list, wherein a posting list is a data structure for storing an identification of each data structure that a search term occurs in.

In embodiments, the system comprises a search module configured to: receive a search term from a user; calculate keyed-hash value of the search term; calculate a search token value from the keyed-hash value of the search term by selecting the β most-significant bits of the keyed-hash value of the search term, where $2^β$ is the number of lists; and forward the search token value to a server(s).

In embodiments, the search module is further configured to:

receive a noisy access pattern from a server, wherein a noisy access pattern comprises a collection of data structures and data structure identifications associated with more than one search term, wherein at least one data structure in the collection is associated with the search term received from the user; match the identifications of the data structures received in the access pattern with the identification of the data structures associated with the search term in the posting list; and remove the data structures from the access pattern that do not have a matching identification.

The method comprises: extracting a plurality of search terms from at least α part of a data structure; calculating a keyed-hash value for each search term and store the keyed-hash values in a list; examining a bit in a first predetermined position in a keyed-hash value for each keyed-hash value to obtain the value of the bit; performing a first determination to determine if it is true that the value of the bit has a first value for at least α of the keyed-hash values, and the value of the bit has a second value for at least α of the keyed-hash values, wherein α is greater or equal to two and the first value is different to the second value; splitting the set of keyed-hash values into two lists if the first determination is true; and assigning a first search token value to the first list and second search token value to the second list each, whereby each search token value is associated with a plurality of search terms.

In embodiments, the value of the first search token value equals the first value and the second search token value equals the second value.

In embodiments, the method further comprises performing a second determination to determine if it is true that: a bit in a second predetermined position has the first value for at least α of the keyed-hash values in the first list; the bit in the second predetermined position has the second value for at least α of the keyed-hash values in the first list; the bit in the second predetermined position has the first value for at least α of the keyed-hash values in the second list; and the bit in the second predetermined position has the second value for at least α of the keyed-hash values in the second list; splitting the first and second lists if the second determination is true, such that the first list is split into a new first and second list and the second list is split into a new third and fourth list; and assigning a new first search token value to the new first list, a new second search token value to the new second list each, a new third value search token value to the new third list, and a new fourth search token value to the new fourth list.

In embodiments, the value of the new first search token value equals the first search token value appended with the first value; the value of the new second search token value equals the first search token value appended with the second value; the value of the new third search token value equals the second search token value appended with the first value; and the value of the new fourth search token value equals the second search token value appended with the second value.

In embodiments, the method further comprises encrypting the keyed-hash values of the search terms before the keyed-hash values are provided to a server.

In embodiments, the method further comprises generating and storing a posting list, wherein a posting list is a data structure for storing an identification of each data structure that a search term occurs in.

The computer readable storage medium comprises a set of instructions which, when executed by a processor, cause the processor to extract a plurality of search terms from a data structure; calculate a keyed-hash value for each search term and store the keyed-hash values in a list; examine a bit in a first predetermined position in a keyed-hash value for each keyed-hash value to obtain the value of the bit; perform a first determination to determine if it is true that the value of the bit has a first value for at least α of the keyed-hash values, and the value of the bit has a second value for at least α of the keyed-hash values, wherein α is greater or equal to two and the first value is different to the second value; split the set of keyed-hash values into two lists if the first determination is true; and assign a first search token value to the first list and second search token value to the second list each.

BRIEF DESCRIPTION OF THE DRAWINGS

The present disclosure will be more clearly understood from the following description of an embodiment thereof, given by way of example only, with reference to the accompanying drawings, in which:

FIG. 1 are tables representing a SSE system according to embodiments.

FIG. 2 is a table of the keyed-hash values for terms in a lexicon according to embodiments.

FIG. 3 is a table of the most significant bits of a set of keyed-hash values according to embodiments.

FIG. 4 is a table of the set of keyed-hash values split into two sub-sets according to embodiments.

FIG. 5 is a table of the set of keyed-hash values split into four sub-sets according to embodiments.

FIG. 9 are tables of aspects of extracting search results from a 'noisy' posting list according to embodiments.

FIG. 11a is a table of aspects of inserting a search token value into a PRT set according to embodiments.

FIG. 11b is a table of aspects of inserting a search token value into a PRT set according to embodiments.

DETAILED DESCRIPTION OF THE DRAWINGS

Figure 6:
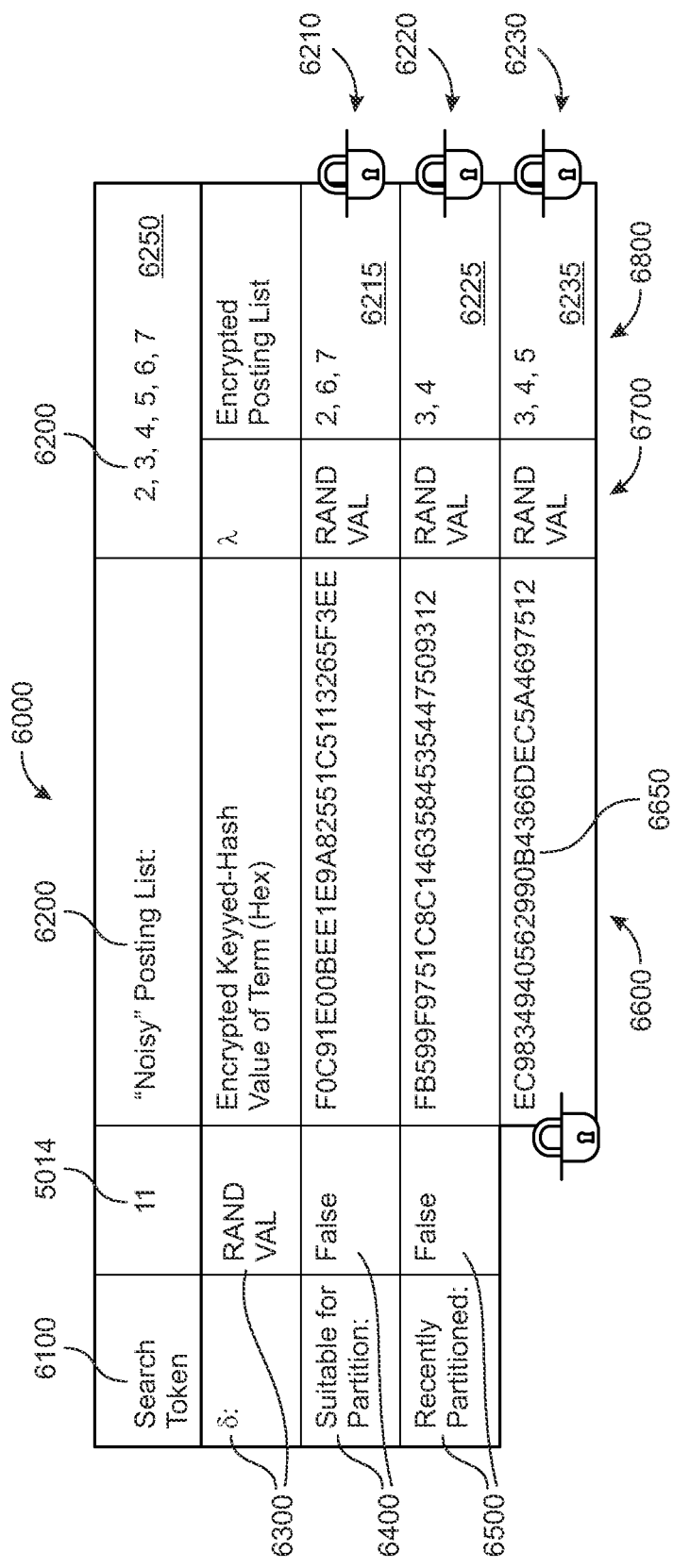
FIG. 6 is a table of a Pseudo-Random Term set according to embodiments.

The present disclosure is directed towards mitigating against LAAs and thereby improving the security of communications between a client and a server. In particular, a system in accordance with the present disclosure improves the security of using a search token to search for a data structure in a collection of data structures. A data structure can be any form of structured or unstructured data. Examples of data structures includes files, such as documents (e.g. documents containing text), image files, audio files, log files, APIs, video files, object-oriented classes such as AI frames, etc. As such, a system in accordance with the present disclosure can be used to securely search for files in a collection of files stored in a filing system. In addition, a data structure can be a sub-component of a file—in this case the file itself is the collection. For example, a data structure could be: a video frame or an image (e.g. a face) in a video; an entry in a database; a communication frame in a data transmission; meta data etc. As a result, a system in accordance with the present disclosure can be used to securely search within for a data structure within another type of data structure.

Thus, the present disclosure has many applications in the fields of e.g. image and video processing, telecommunications (such as telephony, video conferencing, satellite communication (including those associated with space exploration), state security, cryptocurrency, internet of tings (IoT) applications and machine to machine communications, artificial intelligence, mobility services, medical services (e.g. storage of medical data), financial data, company data (e.g. internal data such as trade secrets, know how, personal data, client data, etc.) and personal computing (e.g. smart phones, tablets, PCs) amongst others.

A system according to the present disclosure limits the number of search token values that can be used to a predetermined number—i.e. there are less search token values that search terms. As a result, multiple search terms "share" a search token value. In other words, a plurality of search terms are mapped to a single search token value. As a result, the search pattern is not associated with a unique search term. This increases the difficulty of determining a search term from an intercepted search pattern. For the sake of brevity, the set of terms that share a particular search token value are referred to herein as a 'Pseudo Random Term Set' (PRTS).

In addition, the posting list associated with a search token value in a system according to the present disclosure is "noisy". To put it differently, a posting list in accordance with the present disclosure is not unique to a search token. Instead, it comprises the combined posting lists for all search terms that "share" the associated search token value that was used to generate the search pattern. As a result, the search term is obscured in communications.

In practice, returning a "noisy" posting list will result in one or more data structures being returned to the client that are not associated with the original search term(s) (i.e. the search term that was used to generate the search token value, where search token value was in turn used at the server to generate the posting list). While not relevant to the original search term, such data structures are associated with the other search terms that the search token value(s) provided to the server.

Therefore, the present disclosure also provides a client-side mechanism for extracting a "real" posting list from a "noisy" posting list. To put it differently, the posting list associated with the original search term(s) can be extracted at the client from the "noisy" posting list received at the client from the server. Alternatively, "noise" can be removed from the "noisy" posting list received from the server, leaving the "real" posting list available for use.

The minimum number of search terms that "share" each search token value is a variable that must be specified prior to creating the SSE index associated with the data structure collection. The smaller the minimum number, the lower the security of the system but the better performance of the system in terms of speed. Increasing the minimum number improves the security of the system. However, increasing the minimum number also reduces the speed of the system. Thus, specifying the minimum number sets the speed-security trade-off associated with the present disclosure. In practice, the optimal value for the minimum number depends on a number of factors, for example: the characteristics of the associated data structure collection, the context in which the scheme is deployed, e.g. dynamic/static data structure collection, support for single-keyword/conjunctive queries, single-user/multi-user environments, etc.

The smallest value that can be specified for the minimum number is two (i.e. each search token value is associated with at least two search terms). The largest number that can be specified for the minimum number cannot be specified. In particular, the mechanism for grouping search terms together to map them to a search token value utilizes hash functions. Thus, search terms are grouped together pseudo-randomly. As such, it is not possible to define an upper limit for the minimum number of search terms that can be mapped to a search token value.

In addition to defending against LAAs, the present disclosure also enables SSE to be utilized in parallel information retrieval environments, as well as distributed information retrieval environments. As such, a system in accordance with the present disclosure supports multiple concurrent queries (and by extension, multiple users). In such environments, indexes are partitioned into smaller segments known as index shards. Each server in the system is responsible for processing queries associated with its designated index shard.

Indexes are generally partitioned by term(s) or by data structure(s). In a term-partitioned index, each index shard comprises a subset of the search terms contained within the data structure collection, i.e. all data structures in the collection. In a data structure-partitioned index, the index shard comprises the set of all search terms associated with a subset of the data structure collection. The mechanism outlined in the present disclosure with respect to PRTS is particularly well suited for use with term-partitioning because PRTS partitions encrypted search terms into different sets. In effect, each PRT set can be viewed as an index shard in a term-partitioned index. The index can either be in plaintext of encrypted where extra security is required.

Of particular importance is encrypted dynamic data structure collections (i.e. collections of data structures where the data structures can be removed from the collection and/or data structures can be added to the collection without decrypting the collection). According to the present disclosure, an inverted index can be further partitioned as the data structure collection grows in size. An inverted index (also referred to as a postings file or inverted file) is a database index storing a mapping from content (e.g. words or numbers) to the locations of the content in a data structure or a set of data structures (the inverted index is named in contrast to a forward index, which maps from data structures to content). The purpose of an inverted index is to allow fast full-text searches, at a cost of increased processing when a data structure is added to the database. Further partitioning of the index requires the number of search tokens associated with the data structure collection to be increased.

The frequency with which further division of the index can occur depends on the value specified as the minimum number of terms that each PRT set must contain. The frequency with which further division of the index can occur is how often, as the number of data structures in the collection increases, the index can be divided. For example, when the minimum number is two, the index can be further partitioned after the total number of search terms in the index has approximately doubled (i.e. the number of search terms in the index needs to be increased twofold to allow further partition the index when the minimum number is two). As a further example, the number of search terms in the index needs to be increased threefold to allow further partition of the index when the minimum number is three. In general, for a minimum number $\alpha$, the number of search terms in the index needs to increase $\alpha$-fold to allow a further partition of the index.

The term approximately is used here because the encrypted value (i.e. the search token value) for all search terms is assigned pseudo-randomly. As a result, it is not possible to guarantee that additional search terms introduced to the index (due to modifications to the data structure collection) are evenly distributed across all PRT sets associated with the data structure collection. According to the present disclosure, the client is configured such that each time the data structure collection is modified, it is the client that updates the PRT sets affected by the modification.

In embodiments, after each PRT set is modified, the client examines the PRT set to determine if it is capable of being further partitioned. If a PRT set is capable of being further partitioned, a notification is sent to the server, indicating to the Server(s) that it is possible to further partition the PRT set.

At a certain point, the server will have received a notification for all of the PRT sets (indicating that it is possible to further partition all the PRT sets). In this case, the server(s) simply creates a replica of all existing PRT sets. When a further search is performed and an access pattern has been received at the client, each PRT set is modified by the Client to remove the search terms (and their associated Posting List) that are no longer associated with the search token value for that PRT Set. In general, further partitioning of the index will result in a performance increase over the pre-partition state of the index as the number of search terms that previously shared the associated search token value will have decreased. Thus, the amount of "noise" associated with each search token value is reduced.

The following portion of the disclosure sets out the certain modules of a system in accordance with the present disclosure. In particular, the following modules are described:

A index build;
A search module;
An insert module;
A delete module;
An update module;
A partition module; and
Modify PRT Set Post-Partition.

Depending on the context in which system is used, some of these modules may not be needed. Further, modules may also be adapted to suit specific use contexts. For example, when used with static data structure collections (i.e. data structure collections that will not be modified after being uploaded to a server) only a client side index build module and a server side search module are generally required. However, for very large data structure collections, the index build module may consume excessive client-side resources. This may result in a slow construction of the index. Thus, it may be preferable to use the index module to build an initial index from a subset of the data structure collection. The initial index can then be provided to the server (along with the subset of the data structure collection. The subset of data structures is provided in the encrypted form that was used to build the initial Index. The initial index can then be updated and enlarged at the server using the insert module.

However, all seven modules will generally be utilized when used to store and search dynamic data structure collections (i.e. data structure collections that will be modified after being uploaded to a Server).

For the purposes of the following description, it is assumed that each data structure in the data structure collection has a unique value assigned to it. This unique value is known as the data structure ID. Further, for the avoidance of doubt, 'search term' refers herein to a unit comprised within the contents of one or more data structures. 'Search term' is to be construed broadly—for example a search term may be a text unit in a document. In his case, 'search term' does not have the same meaning as a word. In particular it is commonplace for data structures containing text to contain text that is not classified as words, e.g. 'K-9'. Thus, all words in a data structure storing text are classified as terms, however, not all terms are classified as words. E.g. 'the' is both a word and a term; 'asdfg' is a term, but not a word. Further, as noted above, the search term may relate to other sub-portions of data stored in a data structure. E.g., a search term may be data identifying a portion (e.g. a face) of an image stored in a data structure, etc.

The operation of the index build module can be broken down into a number of steps:

In step i) a standard inverted index is produced substantially conventionally (e.g. in a similar manner to that used in a standard plaintext information retrieval system). In step ii), a sub-set of the steps typically performed when producing an inverted index for use with standard Searchable Symmetric Encryption SSE systems (e.g. such as those outlined in the paper entitled 'Structured Encryption and Controlled Disclosure' by Melissa Chase, et al). However, in contrast to prior art systems, in a system according to the present disclosure, the posting list produced in step i) does not undergo any transformation in step ii). Steps iii) and iv) are concerned with adding "noise" to the system. Steps v) and vi) are concerned with securely providing the index to a server.

In step i), the index build module is provided with a data structure collection in plaintext form. At the Index Build Module, at least a portion of each of the data structures available for search in the collection is tokenized. As used herein, the term 'tokenize' refers to breaking up a data structure into the set of search terms that make up the data structure. The Index Build Module is further configured to compile a list of all search terms encountered. The list of all search terms encountered is also referred to herein as the lexicon. The list of data structures that each term occurs in, i.e. the IDs of each data structure is compiled together with each search term in the lexicon to provide a posting list. I.e. each search term in the lexicon has its own dedicated posting list.

As shown in FIG. 2, in step ii) the index build module is configured to calculate a keyed-hash value 2010 for each term 2510 in the lexicon. Each plaintext search term 2510 is then replaced by its corresponding keyed-hash value 2010 in the lexicon. The keyed-hash value 2010 can be calculated using any suitable method known in the art, e.g.: Keyed-Hash Function, MAC (Message Authentication Code), HMAC (Keyed-Hash MAC; also expanded as Hash-Based MAC), etc. In embodiments, the keyed-hash values produced have a fixed length. Most hash functions can be configured to specify the length of hash produced. In embodiments, the hash function can be configured to use the maximum length for best security.

It should be noted that the same cryptographic key must be used for calculating the keyed-hash value 2010 for all (plaintext) search terms in the lexicon. Furthermore, the cryptographic key is also utilized in the search and insert modules in addition to being used in the index build module. In step iii), the set of search token values and the set of search terms that "share" each search token value is determined. As mentioned previously, a system in accordance with the present disclosure forces multiple search terms to "share" the same search token value (i.e. each search token value is associated with a plurality of search terms). In addition, it was previously stated that it was not possible to specify the maximum number of terms that "share" a search token value, because search terms are grouped together pseudo-randomly. However, it is possible to specify the minimum number of terms that may "share" a Search Token value. The value for the minimum number is denoted in this data structure by the symbol $\alpha$. As mentioned above, $\alpha$ is an integer having a value greater or equal to two.

Each bit of the keyed-hash value produced in step ii) has a bit position within the keyed-hash value. The client is configured to examine individual bit positions from each keyed-hash value produced in step ii). In particular, the client is configured to examine the value of the bit in a first predetermined position for each of the keyed-hash value produced in step ii) (e.g. the most significant bit 3001 in FIG. 3). The value of the bit in the first predetermined position of each keyed-hash value is examined to determine if there are at least $\alpha$ keyed-hash values in the lexicon where the value of the bit in the first predetermined position equals a first value (e.g. zero), and at least $\alpha$ keyed-hash values in the lexicon where the value of the bit in the first predetermined position has a second value (e.g. one).

If this condition is not satisfied, all keyed-hashed lexicon terms will be encapsulated within a single Pseudo-Random Term (PRT) set (see step iv) below). For the sake of brevity, this type of PRT Set is referred to herein as a NULL PRT Set. It should be noted that a NULL PRT Set will only occur for very small datasets.

If this condition is satisfied, the index build module is configured to split the set of keyed-hash values into first 4001 and second 4002 temporary lists as shown in FIG. 4. Each list is then assigned to a specific search token value. For example, all the keyed-hash lexicon terms where the bit in the first predetermined position (e.g. the most significant bit (MSB 3001)) has the first value are placed in a first temporary list 4001. The first temporary list is assigned a first search token value 4011 (e.g. '0'). Similarly, all the keyed-hash lexicon terms where the bit in the first predetermined position (e.g. the MSB 3001) has the second value are placed in a second temporary list 4002. The second temporary is assigned a second search token value 4012 (e.g. '1').

Following this, the index build module is configured to check the value of bits in a second predetermined position (e.g. the second MSBs 3002) in all of the keyed-hash values in both temporary lists. In particular, the bit in the second predetermined position is checked for all the keyed-hash values by the index build module to determine if a further division of the temporary lists is possible. For example, for the first temporary list, the index build module determines if there are at least $\alpha$ keyed-hash values having a bit in the second predetermined position with the first value (e.g. the two MSBs equal '00') and at least $\alpha$ keyed-hash values having a bit in the second predetermined position with the second value (e.g. the two MSBs equal '01'). Likewise, for the second temporary list, the index build module determines if there are at least $\alpha$ keyed-hash having a bit in the second predetermined position with the first value and at least $\alpha$ keyed-hash values having a bit in the second predetermined position with the second value. If this is true, then as shown in FIG. 5 the temporary first list 4001 is split into first 5001 and second 5002 temporary child lists and second list 4002 is split into first 5003 and second 5004 temporary child lists.

As a result, four temporary lists will be produced: a first child list 5001 for all the keyed-hash lexicon terms where the two bits in the first two predetermined positions have a value equal to '00'; a second child list for all keyed-hash lexicon terms where the two bits in the first two predetermined positions have a value equal to '01'; a third child list for all keyed-hash lexicon terms where the two bits in the first two predetermined positions have a value equal to '10'; and a fourth child list for all keyed-hash lexicon terms where the two bits in the first two predetermined positions have a value equal to '11'.

Each of the temporary child lists is assigned a search token value 5011-5014. The search token value is generated from the search token value of child list's parent concatenated with the value of the bit used to generate the child list. Concatenation is defined herein as appending a character on to an existing sequence or string of characters. For example, the first child list 5001 is assigned a search token value 5011 with is the search token value 4011 of its parent (i.e. the first list), e.g. '0', concatenation with second bit used to group the keyed-hash values, which in this case is also '0'. Thus, the first child list 5001 is assigned a search token value 5011 of '00'. Similarly, the second child list 5002 as assigned a search token value 5012 of '01', the third child list 5003 is assigned a search token value 5013 of '10', and the fourth child list 5004 is assigned a search token value 5014 of '11'.

The index build module then proceeds to examine the bit in a third predetermined position (e.g. the third MSB 3003) for each of all keyed-hash values in all four temporary child lists 5001-5004 to see if further division of the temporary lists is possible. For example, for the temporary list associated with Search Token value "00", the Client determines that there are at least $\alpha$ keyed-hash values where the bit in the third predetermined position='0' (e.g. the three MSBs equal '000') and at least $\alpha$ keyed-hash values where the third bit='0' (e.g. the three MSBs equal 001).

If the further division criteria are satisfied for all four child temporary lists 5001-5004, the index build module splits the set of keyed-hash values into the next generation of temporary child lists—again, each new child list is associated with a specific search token value. For example, all keyed-hash lexicon terms where the three bits from the first three predetermined positions (e.g. the three most significant bits) have a value that equals '000' are assigned to the temporary list associated with search token of value '000'.

As will be clear from the above, index build module examines the values at a given bit position within the keyed-hash values in a predetermined examination sequence. For example, the sequence of bit positions examined may start at the most significant bit and be sequenced by decreasing order of significance of the bits—i.e. inspecting the most significant bit first, followed by the second most significant bit, followed by the third most significant bit, etc. Alternatively, the examination of individual bits may start at the least significant bit and be sequenced by increasing order of significance of the bits—i.e. inspecting the least significant bit first, followed by the next least significant bit, etc. Any predetermined sequence can be used so long as the same bit is not examined twice. For example, every second or third bit may be inspected, or the sequence of bit positions examined may be a predetermined random sequence.

Further division of temporary lists can only occur if all temporary lists satisfy the further division criteria. For example, given eight temporary lists—seven of which are capable of being divided further while satisfying the further division criteria and one which cannot—then the algorithm ceases dividing further (as it is not possible to further divide all the existing temporary lists). As such, the final number of temporary lists and—by extension, the number of search tokens—is always a power of two, with the length of the associated search tokens (in bits) equal to the related exponent value (denoted by $\beta$ henceforth).

With reference to FIG. 6, in step iv) the index build module index generates a Pseudo-Random Term (PRT) Set 6000. In particular, the index build module index generates a Pseudo-Random Term (PRT) set 6500 using a set of temporary lists and a set of posting lists. The set of temporary lists is the set of temporary lists generated in step iii). The set of posting lists is the set of posting lists generated in step i) and modified in step ii) (where each plaintext search term from step i) was replaced by its associated keyed-hash value in step ii). The index build module index generates a Pseudo-Random Term (PRT) set 6000 for each of the temporary lists generated in step iii). As noted above, for the sake of brevity the resulting PRT sets are referred to collectively as the index.

A PRT set 6000 is a data structure which can comprise a number of different fields. For example, a PRT set can comprise one or more of the following fields: 1) a field 6100 storing a search token; 2) a field 6200 storing a "noisy" posting list; 3) a filed 6300 storing a value $\delta$, which is explained below in more detail; 4) a field 6400 storing a value indicating whether the index is suitable for partition, 5) a field 6500 storing a value indicating whether the index has been recently partitioned.

In addition, a PRT can also store a data structure for storing a term table comprising three columns: a column 6600 storing the encrypted keyed-hash value of the search terms, a column 6700 storing values of $\lambda$ (which is described below in more detail), and a data structure 6800 for storing an encrypted posting list. Each term that "shares" the search token value encapsulated by a PRT set has an entry in the term table of the PRT set.

The value (e.g. '11' 5014) assigned to the search token 6100 in a PRT set is the same as the search token value (e.g. '11' 5014) associated with the temporary list (e.g. 5004) from which the PRT set was being created in step iii). The total number of PRT sets, and therefore the total number of search token values, is equal to $2^\beta$. The length of all search tokens being $\beta$-bits in length. As a result of step iii), each PRT set 6000 is assigned a unique search token value. Similarly, the $\beta$ bits of the keyed-hash value for each search term encapsulated by the PRT set is equal to the value assigned to the search token field. The search token value assigned to this field remains static unless the value of $\beta$ is adjusted by the partition module.

The "Noisy" posting list 6200 for a PRT Set 6000 is generated by determining the union of all the posting lists 6210, 6220, 6230 associated with the search terms encapsulated by the PRT set 6000. The term 'union' as used herein is intended to have its normal meaning in the context of set theory—i.e. the union (denoted by $\cup$) of a collection of sets is the set of all elements in the collection. It should be noted that the union is determined prior to each individual Posting List being encrypted. For example, given a PRT Set with $\alpha=2$ comprising search terms T1, T2 and T3, wherein T1 has a posting list=$\{2, 6, 7\}$, T2 has a posting list=$\{3, 4\}$, and T3 has a posting list=$\{3, 4, 5\}$, the "Noisy" Posting List for the associated PRT Set is $\{2, 3, 4, 5, 6, 7\}$—i.e. T1 Posting List$\cup$T2 Posting List$\cup$T3 Posting List. The values associated with the "Noisy" posting list (i.e. data structure IDs 6250) are disclosed to the Server in plaintext form. Alternatively, the "noisy" posting list can be provided to the server in encrypted form for additional security. In prior art SSE schemes, the way these values are structured and disclosed to the Server means that it is possible to perform cryptanalytic attacks with some prior knowledge of the data structure collection. The "noisy" approach of the present disclosure renders such attacks infeasible because, through limiting the number of search tokens to a number less than the number of valid search terms, the search terms are obfuscated and cannot be used for cryptanalytic attacks.

In the prior art, the keyed-hash values for all lexicon terms are disclosed to the Server by SSE algorithms. However, as noted above, this information can be used in a cryptographic attack. To overcome this problem, the keyed-hash values of lexicon terms of the present system are encrypted. As such, keyed-hash values are never fully disclosed to the server. Instead, the values of the first j-bits at the first $\beta$ predetermined positions in the examination sequence within each keyed-hash value (e.g. the $\beta$ MSBs) can be disclosed for all of the keyed-hash values (as part of the search token value associated with a PRT-Set). However, disclosure of the values of the remaining bits of each keyed-hash value is prevented by a system according to the present disclosure through the use of encryption. In embodiments, all keyed-hash values for the lexicon are symmetrically encrypted. Encryption is performed across all PRT sets. In some embodiments, encryption is performed using the same cryptographic key.

However, in order to further improve security a different random value (e.g. an initialization vector (IV), starting variable (SV), nonce, etc.) is used to randomize the contents of each PRT set. The random value utilized for this purpose is assigned to $\delta$ 6700, in plaintext form. As will be seen later, the value for $\delta$ 6700 is required at the client side by the search and insert modules. In addition, each time a PRT set is modified by the insert module, the keyed-hash values associated with the set of search terms encapsulated by the PRT Set are re-encrypted using a new random value. This is desirable to obfuscate any changes made to the terms encapsulated by the PRT set. The new random value is then used to overwrite the previous value for $\delta$ 6700 stored in this field.

The value 6400 indicating whether the index is suitable for partition field suitable for partition is a flag. The flag indicates to the partition module at a server whether or not the PRT Set can be split. A Boolean value, i.e. True or False, is assigned to this field. For example, a value of False may be assigned initially by the index build module to this field. However, the flag may be modified at a later point by, e.g. the insert module at a client (setting it to True) or by the partition module at a server (setting it to False).

The value 6500 indicating whether the index has been recently partitioned is a flag that indicates if the PRT set has recently been manipulated by the partition module at the server. The flag can be Boolean value (i.e. true or false). For example, a value of false may be assigned to this field initially by the index build module. However, the value may be updated (e.g. by assigning a value of false to the field) at a later point by the partition module e.g. after performing a partition. The value of this field is used by insert module at the client. In particular, when a value of true is assigned to this field, a post-partition module at the client is used to modify the PRT set when the PRT set is accessed by the client (e.g. when executing an insert with the insert module). After the PRT set has been modified by the post-partition module, the flag that indicates if the PRT set has recently been manipulated by the partition module at the server is set to false, thereby indicating the PRT set has not been recently manipulated by the partition module at the server. Optionally, the value of this filed may also be used by the search module to enable the post-partition module at the client to modify the PRT set when the PRT set is accessed by the client when executing a search with the search module.

With reference to FIG. 6, an entry is recorded in the term table 6600 for each search term encapsulated by a PRT Set. Each entry 6210, 6220, 6230 in the term table can comprise three values. For example, the entry 6230 for a term in the term table 6600 includes the keyed-hash value 6650 of the search term. The keyed-hash value is stored in encrypted form. As mentioned previously, all keyed-hash values are encrypted using the same cryptographic key; however, each PRT set is randomized using a different random value (i.e. $\delta$ 6700).

The entry 6230 for a term in the term table also can include a posting list 6235. In particular, the posting list 6235 associated with a term encapsulated by the PRT Set is stored in encrypted form. All posting lists are encrypted using the same cryptographic key. However, each posting list is randomized for extra security using a different random value. For the sake of brevity, the random value used to randomize a posting list is referred to as $\lambda$ 6700. Those skilled in the art should note that the contents of an encrypted posting list may be confined to a single column of the term table. However, in an alternative arrangement, each encrypted posting could be assigned its own column in the term table.

As noted above, all posting lists (optionally across all PRT sets) are symmetrically encrypted using the same cryptographic key. However, $\lambda$ 6700 is used to randomize each posting list. The random value for $\lambda$ used for a posting lists is stored in the same entry as the posting list. In embodiments $\lambda$ is stored in plain text. However, $\lambda$ can also be encrypted if extra security is required.

In step v), the data structure collection is encrypted locally at the client after the index has been compiled. In step vi), the index and the encrypted data structure collection are uploaded to a remote server.

The search module is a distributed module comprises two sub modules: a first sub-module located at the client and a second sub module located at the server. The two sub-modules are adapted to be coupled over any suitable communication link to perform a search. As described here, one round of communication can occur between the two sub-modules (i.e. the client search sub module send a message (i.e. a search request) to the server, the server sub module sends a response, and the client sub module provides search results for use at the client based on response received from the server search sub module). However, the number of rounds of communication may vary depending on implementation and the technology utilized.

Figures 7, 8:
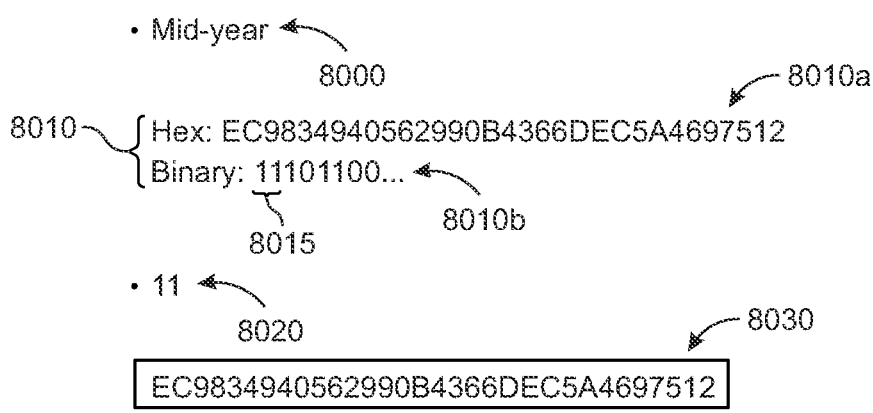
FIG. 7 is a table of a 'noisy' set of data structures according to embodiments.
FIG. 8 is a table of aspects of an encrypted search according to embodiments.

With reference to FIG. 8, to search for a data structure, a search term $\psi$ 8000 is provided to the client search sub module. The client search sub module calculates the keyed-hash value 8010 of $\psi$ 8000. The keyed-hash value 8010 of $\psi$ 8000 is also referred to henceforth as the term token and is show in hexadecimal 8010a and binary 8010b in FIG. 8. The client search sub module then calculates a search token value 8020 for $\psi$ 8000 from the term token value 8010 by selecting the values of $\beta$ bits in the $\beta$ predetermined positions within the term token 8010. For example, if the $\beta$ predetermined positions within the term token 8010 are the two MSBs 8015 of the term token 8010 shown in FIG. 8, then the search token value will have a value of '11'. The client search sub-module then forwards the search token value 8020 for $\psi$ 8000 to the server(s).

With reference to FIG. 6, at the server search sub module, when a search token value is received at the server, the server search module identifies the PRT set having the same search token value 5014 stored in the index and responds by sending all data structures 6250 identified in the associated "noisy" posting list back to the client search sub module. In addition, the server search sub module also sends the value of $\delta$ 6300 from the relevant PRT set back to the client, as well as the associated term table 6600.

Referring back to FIG. 8, at the client search sub-module, the value for $\delta$ is received from the server(s). The client search sub-module encrypts the term token value of $\psi$ calculated previously. The resulting value referred to henceforth as the encrypted term token 8030. The term table received from the server(s) is examined by the client search sub-module to determine if the value of the encrypted term token 8030 is contained within the encrypted keyed-hash values stored in the term table 8040.

If the encrypted term token value 8030 is not present in the term table 8040, then term y 8000 is not present in the data structure collection provided with the index. If the encrypted term token 8030 value is present in the term table 8040, then the client search sub module obtains the entry 8050 in the term table 8040 containing the encrypted term token value 8030. In particular, the client search sub module retrieves $\lambda$ 8060 and the encrypted posting list(s) 8070 associated with the encrypted term token value 8040. The client search sub module decrypts the content of the retrieved encrypted posting list column using $\lambda$ 8060. The resulting value is referred to herein as the real posting list.

As shown in FIG. 9, the client search sub module next identifies the set of data structures that actually contain the term $\psi$ 8000 (i.e. the "noise" is removed). In particular, the client search sub module uses the real posting list 9070 for $\psi$ 8000 derived previously along with the set of data structures 9500 that were returned by the server(s) (along with the "noisy" posting list). The client search sub module identifies the set of data structures 9550 returned by the server(s) that contain the search term $\psi$ 8000 by matching the set of data structure IDs 9070 contained within the real posting list to the data structure IDs contained within the "noisy" posting list 6250 returned by the serve.

It should be noted that if a data structure was removed from the data structure collection using the delete module, then the ID for this data structure will be present in the real posting list but absent from the noisy posting list. As such, the ID for this data structure can be ignored by the client search sub module as it refers to a data structure that has been deleted.

The client search sub module then provides the identified the set of data structures 9550 that contain the search term $\psi$ 8000 for use at the client. For example, the client search sub module may be configured to decrypt the data structures locally at the client.

The insert module is also distributed between the client and the server(s). In particular, the insert module comprises a client insert sub module and a server insert sub module. Those skilled in the art should note that although the following description of the insert module is based on using the insert module to add a single data structure to a pre-existing data structure collection, the insert module can also be used to add multiple data structures to a pre-existing data structure collection.

In embodiments, only one round of communication is required between the client insert sub module and the server insert sub module to upload the data structure to the data structure collection.

Further, the index can update in one round of communication. To put it differently, all of the PRT sets affected by the addition of the new data structure can be updated simultaneously. However, for distributed, multi-user search environments it has been found to be advantageous to configure the insert sub modules to update each PRT set updated individually (i.e. one round of communication for each PRT Set).

In particular, if all PRT sets are updated simultaneously, all the PRT set being updated need to be locked for editing by the server insert sub module. While locked, the PRT sets are downloaded to the client and updated by the client insert sub module to reflect the addition of a new data structure to the collection. Once the PRT sets are updated, they need to be re-uploaded to the server—where the server insert submodule overwrites each original, unmodified PRT set held at the Server with the respective updated PRT set. The server insert submodule can then unlock the updated PRT sets for subsequent editing.

When locked for editing, the original, unmodified PRT Sets held at the server can only process operations associated with the search module. To put it differently, a locked PRT set is only available for read operations. All other operations—which require modifying the PRT Set—can only be processed after the affected PRT Sets are unlocked for editing by the server insert sub module. Thus, while updating all PRT sets simultaneously guarantees strong consistency between the data structure collection and the associated index, it does not scale well to multi-user environments because this approach locks numerous PRT sets preventing the use of the insert, update and delete modules for many users.

As such updating the PRT sets sequentially so that only one PRT set is updated at a time results in a more balanced system. As a result, only one PRT Set is locked for editing by a single user at a time—meaning that all other PRT sets can continue to process requests from other users. This sequential approach supports eventual consistency between the data structure collection and the index. In particular, a data structure will be added to the data structure collection and the index will eventually reflect its content—once the index has been fully updated.

Figure 10:
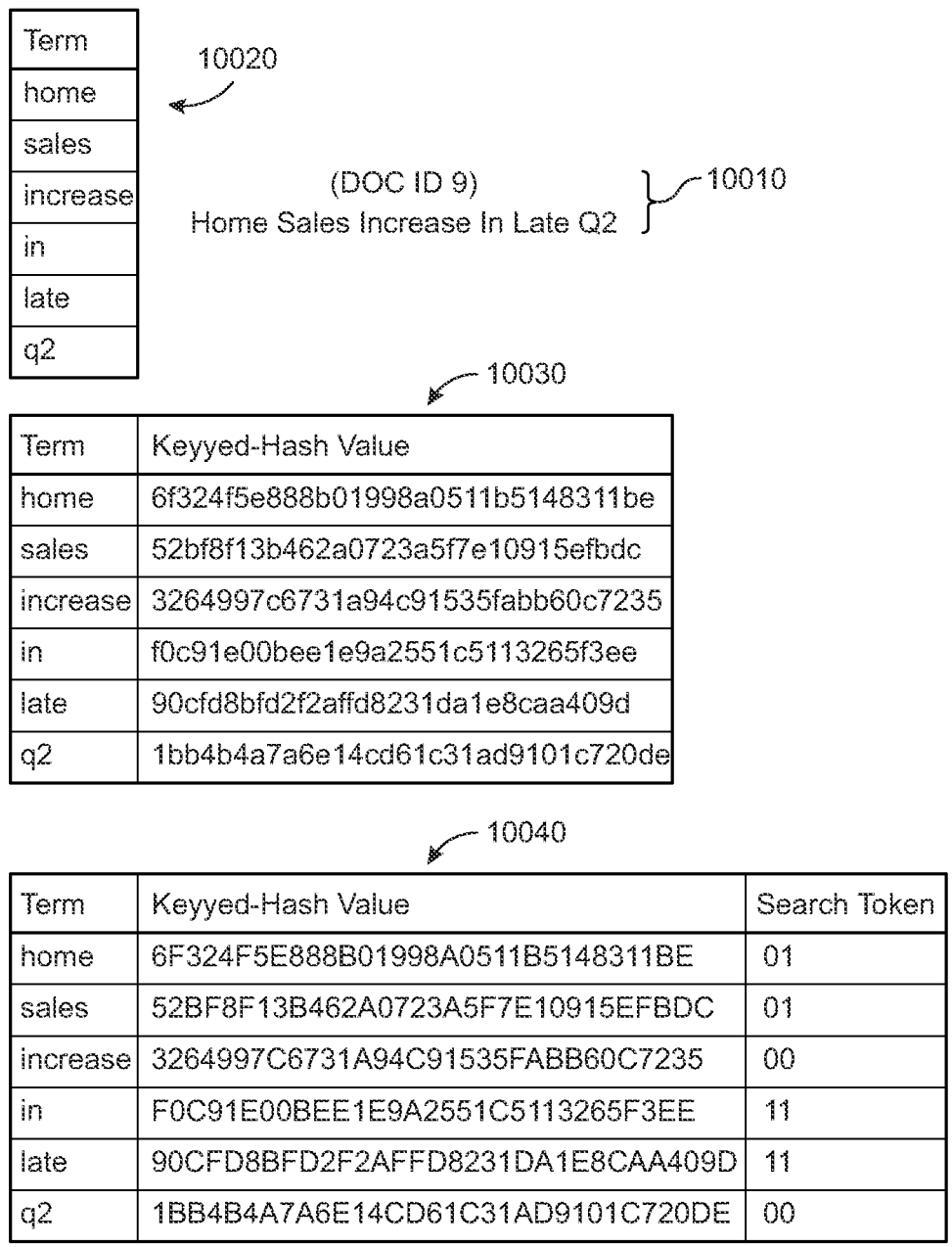
FIG. 10 are tables of aspects of inserting a data structure into a data structure set according to embodiments.

With reference to FIG. 10, if a user wishes to add a data structure 10010 to a data structure collection already stored on the server, the data structure 10010 is provided to the client insert module which tokenizes 10020 the data structure as described above with reference to the index build module. The resulting search terms can be used by the client insert module to calculate the keyed-hash value 10030 for each search term 10020 in the data structure. It should be noted that the cryptographic key used for calculating the keyed-hash value of each search term is the same as that used by the index build module.

The client insert sub module is then configured to calculate the search token value 10040 for each search term using the keyed-hash value for all the search terms in the data structure. This is done by selecting the values of $\beta$ bits in $\beta$ predetermined positions within the keyed-hash values for each keyed-hash value. It should be noted that the sequence of the predetermined positions used by the insert module should be the same as that used by the index build module. For example if the index build module selected the values of the $\beta$ MSBs of each keyed-hash value, the insert module should also use the $\beta$ MSBs of each keyed-hash value. The data structure is then encrypted and uploaded to the server. The system then performs an insert operation to insert search token values for the data structure into the PRT sets.

With reference to FIG. 11*a*, to perform an insert operation, the client insert sub module sends a search token value 10040 and a write lock request to the server. The write lock request is a request to apply a write lock to a PRT set 11010 associated with the search token value 10040 provided by the client insert sub module (so the PRT set held by the server cannot be modified or updated by another client (i.e. it is not accessible to the insert, update or delete sub modules of another client)). The write lock request comprises a request to the server insert sub module to provide the client insert sub module with a copy of the PRT Set 11010.

In response, the server insert sub module applies a write lock to the PRT set associated with the search token value received from the client. The server insert sub module then forwards a copy of the requested PRT set to the client. Henceforth, the version of the PRT set maintained at the server is referred to as the 'Indexed PRT set'.

With reference to FIG. 11*b*, the client insert module accesses the term table 11600 of the PRT set 11010 received from the Server and, using $\delta$ 11300, decrypts the encrypted keyed-hash value 11650 of the search term. The client insert sub module also decrypts each entry in the encrypted posting list column using the associated value of $\lambda$ 18060 in term table. If the recently partitioned field of the PRT set indicates that the PRT set has been recently partitioned, the client insert sub module passes the PRT set to the modify module which further processes the PRT set (as described below in more detail).

The client insert sub module identifies the search terms in the data structure that share the search token value associated with the PRT Set. For each search term, the client insert sub module is configured to determine if the search term is already present in the PRT set by comparing the keyed-hash value of the search term to the decrypted keyed-hash values obtained from the term table.

If the search term is present in the term table, the data structure ID of the data structure 11900 is appended to the posting list 16210 associated with the search term. If the search term is not present in the term table, then the keyed-hash value of the search term is inserted into the term table with the data structure ID listed as the first entry in the associated posting list. Irrespective of whether or not the search term was present in the term table previously, the data structure ID is also appended to the "Noisy" posting list associated with the PRT set.

After the client insert module has updated the term table as set out above, the client insert module then determines if the PRT set can be further partitioned at the server at a later point using the partition module. In particular, the value of next bit position in the examination sequence (i.e. bit $\beta+1$ in the examination sequence) is examined for each entry in the term table. For example, if the examination sequence starts at the most significant bit and is sequenced by decreasing order of significance of the bits, the client sub insert module examines the $\beta+1$ most significant bits of each entry in the term table. If there are at least $\alpha$ entries with $\beta+1$ most significant bits equal to the search token value concatenated with '0' and at least $\alpha$ entries with $\beta+1$ most significant bits equal to the search token value concatenated with '1', then the client insert sub module sets the suitable for partition field of the PRT Set so that it indicates that the PRT set is suitable for partition.

The client insert sub module then encrypts the keyed-hash values posting lists in the term table as described above with reference to the index build module. However, new random values are used for $\delta$. In addition, new values are chosen for $\lambda$ for each entry in term table. This PRT set is referred to herein as the 'updated PRT set'. The client insert module then forwards the updated PRT set to the server.

On receipt of the updated PRT set from the client, the server insert module applies a read lock to the indexed PRT Set which was being maintained at the server. I.e. the indexed PRT Set is no longer available to the search module. It should be noted that the read lock is applied in addition to the write lock previously applied to the indexed PRT set previously discussed. The server insert sub module overwrites the indexed PRT set with the modified PRT set received from the client. The read and write locks are removed by server insert sub module. Thus, the updated PRT set is again available for all modules.

Those skilled in the art should note that this process should be repeated sequentially for each PRT Set affected by the new data structure being added to the data structure collection. E.g. after an updated PRT set has been sent to the server, the client insert sub module can send a request for the next PRT Set affected be locked for writing etc.

The delete module comprises a client delete sub module and a server delete sub module. In embodiments, only one round of communication is required between these sub modules. All PRT Sets affected by the deletion of a data structure can be updated simultaneously, or each PRT Set can be updated individually. Similarly to an insertion with the insert module, multiple PRT sets may be affected by the deletion of a data structure.

As noted above the changes necessitated by the insert module a round trip between the server and the client, as well as significant work at the client insert sub module. Thus using the insert module to update the PRT sets simultaneously limits the availability of the PRT sets this time. To minimize the impact of an Insert operation on other users, only one PRT Set is modified at a time when using the Insert algorithm.

However, when using the delete module, updates are performed by the server delete sub module and not by the client delete sub module. In addition, the amount of work performed by the delete module is far less that the performed by the insert module. As a result, the server delete sub module can simultaneously update all PRT Sets affected by the deletion of a data structure. It should be noted that the term table within each PRT set is not updated by the delete module. Instead, the modify module is delegated to update this section of a PRT set as disclosed later in this application.

In order to delete a data structure, the data structure ID is provided to the client delete sub module. The client delete sub module sends a delete request to the server. The delete request includes the data structure ID and requests that the server delete sub module delete the data structure associated with the data structure ID.

The server delete sub module receives the delete request and the data structure ID provided by the client. The server delete sub module identifies those PRT Sets that contain the data structure ID in their "noisy" posting list. The server delete sub module then applies a read lock and a write lock to the identified PRT Sets. The server delete sub module then removes the specified data structure ID value from the "Noisy" Posting List. Once this has been done, the server delete sub module removes the read and write locks. The server delete sub module can then remove the data structure associated with the specified data structure ID from the data structure collection.

Those skilled in the art should note that there is no dedicated update module or algorithm associated with the present disclosure. Whilst it is envisaged that such a module could be used, it would need to track the exact changes made from one version of a data structure to the next. However, such a module would be inefficient. Instead, the original version of a data structure can be removed from the data structure collection using the delete module and the updated version of the same data structure should be immediately added to the data structure collection using the insert module. It is possible, and in some cases preferable, that the updated version of a data structure has a different data structure ID to the original version of the data structure. These different data structure IDs maintain referential integrity between the index and the data structure collection.

The partition module is located at the server(s). The partition module is configured to operate at set intervals. When operable, the partition module determines if each PRT set associated with the Index can be further partitioned. In particular, the partition is configured to examine the value assigned to the suitable for partition field within each PRT set (it should be noted that this filed can only be modified by clients insert sub module). If, for all PRT sets, the suitable for partition field indicates that the PRT set is suitable for partition, then partition module performs a partition.

The partition module is used to double the number of PRT sets associated with the Index. In conjunction with the modify module, use of the partition module results in the number of terms contained within all PRT Sets being reduced. The amount of "noise" in the associated "noisy" access pattern is also reduced. As such, the partition module and the modify module are used as a mechanism for balancing the speed and security performance as the data structure collection grows.

Those skilled in the art will note that the value of $\beta$ is increased by one with each successful execution of the Partition Index algorithm. As such, the length of all search token values increases by one bit. From a security perspective, this results in one additional bit being disclosed to the Server for each keyed-hash value within the Lexicon. Thus, the higher the value of a the less often a partition is performed. As noted above, the value selected for $\alpha$ is a trade-off between performance and security.

Once the partition module has determined that each PRT set associated with the index can be further partitioned, the partition module creates two new PRT sets for each existing PRT set. In particular, the partition module creates two copies of each PRT set—a first copy and a second copy. The partition module assigns the value 'True' to the recently partitioned field of both copies of the PRT set. The partition module then appends a first binary value to the search token value of one of the copies and appends a second binary value to the search token value of the other copy, wherein the first binary value is different to the second binary value. E.g. the partition module may append a bit value of zero, i.e. '0', to the existing search token value of the first copy and append a bit value of one, i.e. '1', to the search token value of the second copy. Thus, two new PRT sets are generated, each having its own search token value.

After the partition module created two new PRT sets for each of the existing PRT sets as set out above, the partition module removes the existing index and then creates a new index based on the newly created PRT Sets.

The modify module is located at the client. As described here, the algorithm is an extension of the insert algorithm outlined above. The modify module is configured to tidy up search terms in a PRT set. In particular, when a PRT set has been modified by the partition module, the PRT set will contain search terms which are now obsolete as they do not share the associated search token value. Such obsolete search terms (and in some embodiments the posting lists associated with them) need to be removed from the PRT set. I.e. obsolete search terms and associated posting lists need to be removed from the term table section of the PRT set, and from the "Noisy" access pattern associated with the PRT set.

If the recently partitioned field indicates that the PRT set has been recently partitioned, the modify module examines the keyed-hash value of all the search terms in the term table to determine if the values of the $\beta$ bits in the examination sequence (e.g. the values of the $\beta$ most significant bits) of each entry is equal to the search token value associated with the PRT Set. If the modify module identifies a search term where the value of the $\beta$ bits in the examination sequence in its keyed-hash is different to the search token value associated with the PRT set, then this is an obsolete search term (i.e. a search term that is to be removed from the PRT set). The modify module next examines each entry in the posting lists associated with each obsolete search term. If an entry in the posting list associated with an obsolete search term is not present in the posting list of any other search terms (i.e. search terms that will remain in the PRT set), then the associated entry is to be removed from the "noisy" posting list for the PRT set. After the "noisy" posting list has been updated as set out above, the modify module removes the obsolete search term from the term table.

If the modify module identifies a search term where the value of the $\beta$ bits in the examination sequence in its keyed-hash is the same as the search token value associated with the PRT set, then this is an active search term (i.e. a search term that is to remain in the PRT set). The modify module next examines each entry in the posting lists associated with each active search terms. If an entry for an active search term in the associated posting lists is not present in the "Noisy" Posting List for the PRT set, that entry will be removed from the posting list. If any active search term is left with an empty posting list, that search term may be removed from the term table provided there are at least $\alpha$ search terms remaining in the term table.

The modify module then re-calculates the "noisy" posting list associated with the PRT set in as described above with reference to the index build module. The modify module then updates the value of the recently partitioned field in the PRT set such that it indicates that the PRT set has not been recently partitioned.

The description above sets out examples of how a system in accordance with the present disclosure works. Nevertheless, it will be understood that various modifications can be made and equivalents can be used without departing from the spirit and scope of the present disclosure.

The invention claimed is:

1. A system for searchable encryption, comprising:
a client device, the client device comprising an index build module, wherein the index build module comprises a processor configured to:
   extract a plurality of search terms from at least part of a data structure;
   calculate a keyed-hash value for a search term of the plurality of search terms and store the keyed-hash value in a list of keyed-hash values;
   examine a bit in a first predetermined position of the keyed-hash value to obtain a value of the bit;
   perform a first determination to determine if it is true that:
      the bit has a first value for at least $\alpha$ of the keyed-hash values in the list, and
      the bit has a second value for at least $\alpha$ of the keyed-hash values in the list, wherein $\alpha$ is a number greater or equal to two and the first value is different to the second value; and
   if the first determination is true:
      split the list of keyed-hash values into a first list and a second list; and
      assign a first search token value to the first list and a second search token value to the second list, such that each search token value is associated with a plurality of search terms.

2. The system of claim 1, wherein the first search token value equals the first value and the second search token value equals the second value.

3. The system of claim 2, wherein the index build module is further configured to:
   perform a second determination to determine if it is true that:
      for at least $\alpha$ of the keyed-hash values in the first list:
         a bit in a second predetermined position has the first value; and
         the bit in the second predetermined position has the second value;
      for at least $\alpha$ of the keyed-hash values in the second list:
         the bit in the second predetermined position has the first value; and
         the bit in the second predetermined position has the second value; and
   if the second determination is true:
      split the first list and the second list, such that the first list is split into a new first list and a new second list, and the second list is split into a new third list and a new fourth list; and
      assign a new first search token value to the new first list, a new second search token value to the new second list, a new third search token value to the new third list, and a new fourth search token value to the new fourth list.

4. The system of claim 3, wherein:
the new first search token value equals the first search token value appended with the first value;

the new second search token value equals the first search token value appended with the second value;
the new third search token value equals the second search token value appended with the first value; and
the new fourth search token value equals the second search token value appended with the second value.

5. The system of claim 1, wherein the index build module is configured to encrypt the keyed-hash values before the keyed-hash values are provided to a server.

6. The system of claim 1, wherein the index build module is configured to generate and store a posting list, wherein the posting list is a data structure for storing an identification of each data structure that at least one of the plurality of search terms occurs in.

7. The system of claim 6, further comprising a search module configured to:
receive a search term from a user;
calculate a keyed-hash value of the search term;
calculate a search token value from the keyed-hash value of the search term by selecting $\beta$ most-significant bits of the keyed-hash value of the search term, where $2^\beta$ is a number of lists; and
forward the search token value to a server.

8. The system of claim 7, wherein the search module is further configured to:
receive a noisy access pattern from the server, wherein a noisy access pattern comprises a collection of data structures and data structure identifications associated with more than one search term, wherein at least one data structure in the collection is associated with the search term received from the user;
match the data structure identifications received in the noisy access pattern with the identification of the data structures associated with the search term in the posting list; and
remove the data structures from the noisy access pattern that do not have a matching identification.

9. A method for searchable encryption, comprising:
extracting a plurality of search terms from at least a part of a data structure;
calculating a keyed-hash value for a search term of the plurality of search terms and store the keyed-hash value in a list of keyed-hash values;
examining a bit in a first predetermined position of the keyed-hash value to obtain a value of the bit;
performing a first determination to determine if it is true that:
the bit has a first value for at least $\alpha$ of the keyed-hash values in the list, and
the bit has a second value for at least $\alpha$ of the keyed-hash values of the list, wherein $\alpha$ is greater or equal to two and the first value is different to the second value; and
if the first determination is true:
splitting the list of keyed-hash values into a first list and a second list; and
assigning a first search token value to the first list and second search token value to the second list, such that each search token value is associated with a plurality of search terms.

10. The method of claim 9, wherein the first search token value equals the first value and the second search token value equals the second value.

11. The method of claim 10, further comprising:
performing a second determination to determine if it is true that:
for at least $\alpha$ of the keyed-hash values in the first list:
a bit in a second predetermined position has the first value; and
the bit in the second predetermined position has the second value;
for at least $\alpha$ of the keyed-hash values in the second list:
the bit in the second predetermined position has the first value; and
the bit in the second predetermined position has the second value; and
if the second determination is true:
splitting the first list and second list, such that the first list is split into a new first list and a new second list, and the second list is split into a new third list and a new fourth list; and
assigning a new first search token value to the new first list, a new second search token value to the new second list a new third search token value to the new third list, and a new fourth search token value to the new fourth list.

12. The method of claim 11, wherein:
the new first search token value equals the first search token value appended with the first value;
the new second search token value equals the first search token value appended with the second value;
the new third search token value equals the second search token value appended with the first value; and
the new fourth search token value equals the second search token value appended with the second value.

13. The method of claim 9, comprising encrypting the keyed-hash values before the keyed-hash values are provided to a server.

14. The method of claim 9, comprising generating and storing a posting list, wherein the posting list is a data structure for storing an identification of each data structure that at least one of the plurality of search terms occurs in.

15. A non-transitory computer readable storage medium comprising a set of instructions which, when executed by a processor, cause the processor to:
extract a plurality of search terms from at least $\alpha$ part of a data structure;
calculate a keyed-hash value for a search term of the plurality of search terms and store the keyed-hash value in a list of keyed-hash values;
examine a bit in a first predetermined position of the keyed-hash value to obtain a value of the bit;
perform a first determination to determine if it is true that:
the bit has a first value for at least $\alpha$ of the keyed-hash values in the list, and
the bit has a second value for at least $\alpha$ of the keyed-hash values in the list, wherein $\alpha$ is greater or equal to two and the first value is different to the second value; and
if the first determination is true:
split the list of keyed-hash values into a first list and a second list; and
assign a first search token value to the first list and second search token value to the second list, such that each search token value is associated with a plurality of search terms.

16. The non-transitory computer readable storage medium of claim 15, wherein the first search token value equals the first value, and the second search token value equals the second value.

17. The non-transitory computer readable storage medium of claim 16, further comprising:
performing a second determination to determine if it is true that:
for at least $\alpha$ of the keyed-hash values in the first list:

a bit in a second predetermined position has the first value; and
the bit in the second predetermined position has the second value;
for at least $\alpha$ of the keyed-hash values in the second list:
the bit in the second predetermined position has the first value; and
the bit in the second predetermined position has the second value; and
if the second determination is true:
splitting the first list and second list, such that the first list is split into a new first list and a new second list, and the second list is split into a new third list and a new fourth list; and
assigning a new first search token value to the new first list, a new second search token value to the new second list, a new third search token value to the new third list, and a new fourth search token value to the new fourth list.

18. The non-transitory computer readable storage medium of claim 17, wherein:
the new first search token value equals the first search token value appended with the first value;
the new second search token value equals the first search token value appended with the second value;
the new third search token value equals the second search token value appended with the first value; and
the new fourth search token value equals the second search token value appended with the second value.

19. The non-transitory computer readable storage medium of claim 15, comprising encrypting the keyed-hash values before the keyed-hash values are provided to a server.

20. The non-transitory computer readable storage medium of claim 15, comprising generating and storing a posting list, wherein the posting list is a data structure for storing an identification of each data structure that at least one of the plurality of search terms occurs in.

* * * * *